(12) United States Patent
Gong (10) Patent No.: US 10,267,555 B2
(45) Date of Patent: Apr. 23, 2019

(54) METHOD FOR REMOVING SCREEN COATING FILM

(71) Applicant: NINGBO JINGEAO ELECTRONICS CO., LTD, Cixi (CN)

(72) Inventor: Yangdan Gong, Cixi (CN)

(73) Assignee: NINGBO JINGEAO ELECTRONICS CO., LTD., Cixi (CN)

( * ) Notice: Subject to any disclaimer, the term of this patent is extended or adjusted under 35 U.S.C. 154(b) by 268 days.

(21) Appl. No.: 15/410,800

(22) Filed: Jan. 20, 2017

(65) Prior Publication Data
US 2017/0299258 A1    Oct. 19, 2017

(30) Foreign Application Priority Data

Apr. 15, 2016 (CN) .......................... 2016 1 0235961

(51) Int. Cl.
| | |
|---|---|
| *B32B 43/00* | (2006.01) |
| *F25D 27/00* | (2006.01) |
| *B08B 3/08* | (2006.01) |
| *B26B 3/00* | (2006.01) |
| *F25D 23/02* | (2006.01) |
| *B08B 1/00* | (2006.01) |
| *B08B 3/04* | (2006.01) |
| *B29C 63/00* | (2006.01) |
| *B08B 5/04* | (2006.01) |
| *G02F 1/1335* | (2006.01) |
| *G02F 1/1368* | (2006.01) |
| *G02F 1/13* | (2006.01) |

(52) U.S. Cl.
CPC .............. *F25D 27/005* (2013.01); *B08B 1/00* (2013.01); *B08B 3/04* (2013.01); *B08B 3/08* (2013.01); *B26B 3/00* (2013.01); *B29C 63/0013* (2013.01); *B32B 43/006* (2013.01); *F25D 23/028* (2013.01); *B08B 5/04* (2013.01); *C09J 2205/302* (2013.01); *G02F 1/1368* (2013.01); *G02F 1/133528* (2013.01); *G02F 2001/1316* (2013.01); *Y10S 156/924* (2013.01); *Y10T 156/1111* (2015.01); *Y10T 156/1116* (2015.01); *Y10T 156/1184* (2015.01)

(58) Field of Classification Search
CPC .......... Y10T 156/1111; Y10T 156/1116; Y10T 156/1184; Y10S 156/924; B32B 43/006; C09J 2205/302
See application file for complete search history.

(56) References Cited

U.S. PATENT DOCUMENTS

| 5,439,747 A * | 8/1995 | Sturdevant ............... B05D 7/16 427/387 |
| 2015/0101137 A1* | 4/2015 | Xu .......................... A47L 13/12 15/104.93 |
| 2018/0257267 A1* | 9/2018 | Aymonier ................ C08J 11/06 |

FOREIGN PATENT DOCUMENTS

JP    2017198987 A    * 11/2017    ............. B32B 27/08

\* cited by examiner

*Primary Examiner* — Mark A Osele
(74) *Attorney, Agent, or Firm* — Ding Yu Tan (57) ABSTRACT

The present invention discloses a method for removing a screen coating film, which comprises: s1. film cutting: the screen coating film is cut at four sides thereof with a cutter, with the cutting depth being the thickness of the coating film; s2. film soaking: the coating film of the screen is soaked in a solution for 4 to 5 hours; s3. re-cutting: the screen coating film is re-cut with the cutter, with the cutting depth being the thickness of the coating film; s4. film tearing: the cut coating film is torn off from the screen; s5. glue cutting: glue that is not torn off on the surface of the screen is cut off with a special cutter; s6. scrubbing and cleaning: the screen is thoroughly cleaned and scrubbed with a detergent; and s7. suck-drying: the detergent remaining on the screen is suck-dried.

9 Claims, 3 Drawing Sheets

METHOD FOR REMOVING SCREEN COATING FILM

TECHNICAL FIELD OF THE INVENTION

The present invention relates to the technical field of film removal from a display screen, and in particular to a method for removing a screen coating film.

BACKGROUND OF THE INVENTION

With the development of society and the advancement of scientific technology, those widely applied electrical appliances, such as refrigerators, have been improved many times, and for refrigerators and the like, there have been a growing number of requirements from users. For example, refrigerators need to be enhanced in their refrigeration effect and become more environmental-friendly, more power-saving and less noisy.

At present, transparent materials like tempered glass and display screen technologies are being developed at high speed, as users make new demands on refrigerators: articles refrigerated or preserved inside become visible through a refrigerator door, and apart from that, an additional display device needs to be mounted for information playback.

As for the display screen therein, the surface of an ordinary screen will be coated with a film coating to improve light transmittance, protect the screen thereof or achieve other purposes. But sometimes, due to presence of this film coating, some performances of the film-coated screen fail to meet the operating or quality requirements. In this case, the film coating needs to be removed from the screen. Nonetheless, no effective method has been found yet to achieve this purpose.

Considering the defects or problems mentioned herein above, the inventor has finally achieved the present invention after a long term of study and practice.

SUMMARY OF THE INVENTION

To overcome above-mentioned technical defects, a technical solution adopted in the present invention is that a method for removing a screen coating film is provided, which comprises the following steps: Step s1. film cutting step: the screen coating film (for a screen) is cut at four sides thereof with a cutter, with the cutting depth being the thickness of the screen coating film; Step s2. film soaking step: the screen coating film of the screen is soaked in a solution for 4 to 5 hours; Step s3. re-cutting step: the screen coating film is being re-cut with the cutter, with the cutting depth being the thickness of the screen coating film; Step s4. film tearing step: the cutted screen coating film is torn off from the screen; Step s5. glue cutting step: glue that is not torn off on the surface of the screen is cut off with a special cutter; Step s6. scrubbing and cleaning step: the screen is thoroughly cleaned and scrubbed with a detergent; and Step s7. suck-drying step: the detergent remaining on the screen is suck-dried (or removed by applying suction).

Preferably, the special cutter has a flat cutting edge.
Preferably, the detergent is alcohol.
Preferably, the solution is an aqueous solution containing washing-up liquid.
Preferably, the screen is a TFT liquid crystal screen, an LCD screen or an LED screen.
Preferably, the coating film or the screen coating film is a polarizing film.
Preferably, the cutter is a utility knife or a scalpel.
Preferably, the time for soaking of the screen coating film in the solution is 4.5 hours.
Preferably, the method for removing the screen coating film further comprises another step, namely step s8. film affixing step: another coating film is affixed to the screen.

Compared with the prior art, the present invention has the beneficial effects that: a method for removing a screen coating film is provided, which enables a smooth removal of the screen coating film from the screen and is simpler in process and convenient for operation. After cutting, the screen coating film can be cut apart to function as an inlet or flow channel for the solution while soaking, so that through this cut portion, the solution can enter a portion where the coating film and the screen are bonded during subsequent soaking. By doing so, the effect of soaking can be improved, and meanwhile, the time for soaking of the screen coating film in the solution can be reduced as well. Cutting screen coating film into strips contributes to tearing the screen coating film off from the screen.

BRIEF DESCRIPTION OF THE DRAWINGS

For a better clarity in illustrating the technical solution in various embodiments of the present invention, the drawings required to describe the embodiments will be briefly introduced hereinafter.

DETAILED DESCRIPTION OF THE PREFERRED EMBODIMENTS OF INVENTION

The above and other technical features and advantages of the present invention will be illustrated in more details in conjunction with the drawings.

According to an embodiment of present invention, a refrigerator door comprises: a display device, a gripping device, a fixing device and a control device; the display device is used for displaying multimedia information; the gripping device is used for gripping the display device in the middle and clamping the display device; the fixing device serves to fix the display device, the gripping device and the control device; and the control device controls the display device.

In this way, the display device can be fixed to the refrigerator door for displaying multimedia information.

Figure 1:
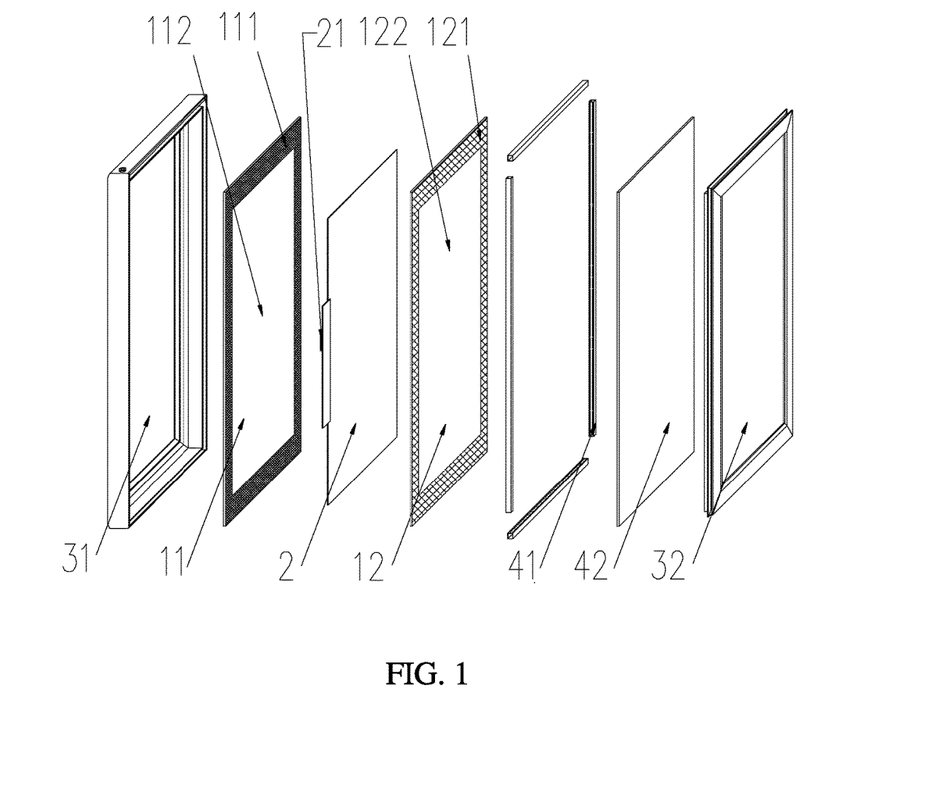
FIG. 1 is an exploded view of a refrigerator door of the present invention.
Figure 2:
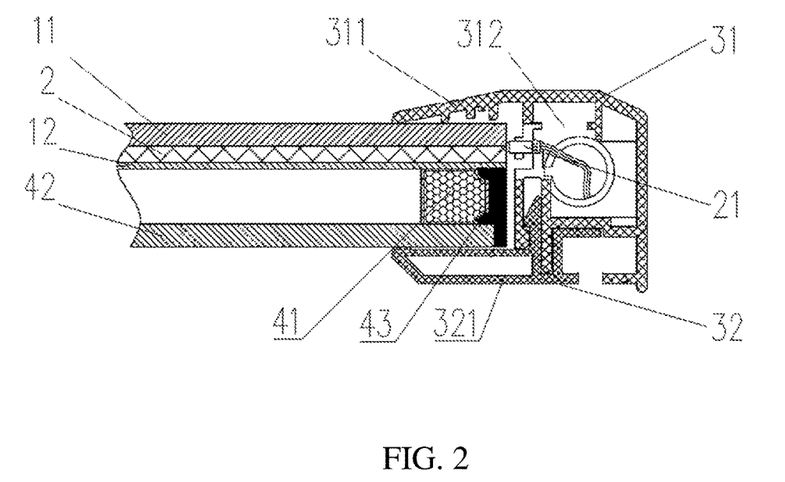
FIG. 2 is a partially sectional view of a refrigerator door of the present invention.

The various devices included in the refrigerator door will be detailed below by reference to FIG. 1 and FIG. 2.
<Display Device>

The display device for the refrigerator door comprises a display screen 2 and the display screen 2 is a liquid crystal display. The liquid crystal display has good display effect, and is a thin sheet such that gripping and fixation thereof are facilitated.

A port 21 for connection with the control device and for reception of a control signal is fixed on one side of the display screen 2. Thus the display screen 2 can play multimedia resources under the control of the control device.

The side of the display screen 2 on which the port 21 is disposed overlaps with one side of the fixing device, so that the port 21 can be hidden to improve the aesthetic effect.

The display screen 2 is externally provided with a coating film (not shown in the drawings). Thus on the one hand, the display screen 2 can be put or placed under protection (by the coating film), and while on the other hand, light transmittance (e.g. a highly light-transparent polarizing film) or other properties can be enhanced by the coating film.

The liquid crystal display is a TFT liquid crystal screen in which a semiconductor switch is provided for each pixel and each pixel can be directly controlled through dot pulses. Therefore, each node is relatively independent and can be continuously controlled. Such a design not only increases the response speed of the display screen, but also enables a precise control over display gray scale, making the TFT liquid crystal screen more vivid in colors and more worth watching.

<Gripping Device>

The gripping device for the refrigerator door comprises an outer-layer protective screen 11 and an inner-layer protective screen 12, and the outer-layer protective screen 11 and the inner-layer protective screen 12 are respectively closely affixed to the two side surfaces of the display screen 2 to grip the display screen 2 therebetween and grip and fix the display screen 2.

Cushioning (elastic) glue (not shown in the drawings) is affixed to a location where the display screen 2 and the outer-layer protective screen 11 are bonded, and this aims at preventing the situation where the display effect of the display screen 2 is compromised due to the fact that the coating film of the display screen 2 is affixed to the outer-layer protective screen 11 to create watermarks. In the meantime, the cushioning glue can also provide cushioning against a force between the display screen 2 and the outer-layer protective screen 11, thereby avoiding damage to the display screen 2 or the outer-layer protective screen 11.

The cushion glue has a thickness of 0-1 mm, and accordingly has outstanding cushioning effects for the display screen 2 and the outer-layer protective screen 11, while simultaneously exerting no negative impact upon the display effect of the liquid crystal display.

The outer-layer protective screen 11 comprises an outer screen printing portion 111 and an outer blank portion 112; the outer screen printing portion 111 is located at the edge of the outer-layer protective screen 11 and used to shield the port 21 of the display screen 2; the outer blank portion 112 is of a transparent material, which is conducive for viewers to watching the content displayed on the display screen 2.

The outer blank portion 112 has the same size as the display screen 2 (the size, other than the port 21, of the display screen 2 for content display), and their mounting locations are corresponding to each other. Thus, there is no shielding or blocking on the display of the display screen 2.

The outer-layer protective screen 11 can be made of tempered glass, which can protect the display screen 2 and prevent the display screen 2 from being damaged by external forces.

Cushioning glue (not shown in the drawings) is affixed to a location where the display screen 2 and the inner-layer protective screen 12 are bonded, and this aims at preventing the situation where the display effect of the display screen 2 is compromised due to the fact that the coating film of the display screen 2 is affixed to the inner-layer protective screen 12 to create watermarks. In the meantime, the cushioning glue can also provide cushioning against a force between the display screen 2 and the inner-layer protective screen 12, thereby avoiding damage to the display screen 2 or the inner-layer protective screen 12.

The cushion glue has a thickness of 0-1 mm, and accordingly has outstanding cushioning effects for the display screen 2 and the inner-layer protective screen 12, while simultaneously exerting no negative impact upon the display effect.

The inner-layer protective screen 12 comprises an inner screen printing portion 121 and an inner blank portion 122; the inner screen printing portion 121 is located at the edge of the inner-layer protective screen 12 and used to shield the port 21 of the display screen 2; the inner blank portion 122 is of a transparent material, which is conducive for viewers/users to watching the content displayed on the display screen 2. The inner blank portion 122 has the same size as the display screen 2 (the size, other than the port 21, of the display screen 2 for content display), and their mounting locations are corresponding to each other. Thus, a user is able to see or observe the interior of the refrigerator door through the display screen 2 as the user's eyesight is not blocked.

The inner-layer protective screen 12 can be made of tempered glass, which can protect the display screen 2 and prevent the display screen 2 from being damaged by external forces.

<Fixing Device>

The fixing device for the refrigerator door comprises an outer door frame 31 and an inner door frame 32; the outer-layer protective screen 11, the display screen 2 and the inner-layer protective screen 12 are sequentially placed in the outer door frame 31, and the inner door frame 32 are in clamped connection with the outer door frame 31 so that the outer door frame 31, the outer-layer protective screen 11, the display screen 2, the inner-layer protective screen 12 and the inner door frame 32 are integrally assembled together.

The outer door frame 31 and the inner door frame 32 are detachably connected, and this is convenient for servicing or replacement of the outer-layer protective screen 11, the display screen 2 and the inner-layer protective screen 12.

The outer door frame 31 is a rectangular frame, and one side, which is in contact with the outer-layer protective screen 11, the display screen 2 and the inner-layer protective screen 12, of the outer door frame 31 is an inner side thereof. A protrusion 311 is bonded with the screen printing portion 111 of the outer-layer protective screen 11 to press and limit the outer-layer protective screen 11 on this inner side.

The outer door frame 31 is of a hollow structure and the port 21 is hidden in a hollow portion 312 at one side of the outer door frame 31. In this way, the port 21 can be protected from being damaged by external forces after exposed, while simultaneously achieving an eye-pleasing appearance.

An inner protrusion 321 is disposed at the inner side of the inner door frame 32.

<Control Device>

The control device for the refrigerator door is a controller (not shown in the drawings). The controller is located in the hollow portion of the outer door frame 31, which, on the one hand, provides protection for the controller, and on the other hand, shields the controller to improve the aesthetic effect of the refrigerator door.

The controller is connected with the port 21 for controlling the display screen 2 through the port 21.

The controller is provided thereon with at least one information receiving end for receiving external information or commands.

<Thermal Insulation Device>

The refrigerator door further comprises a thermal insulation device. The thermal insulation device isolates heat transfer occurring between the interior of the refrigerator and the outside through the refrigerator door, and also prevents the display screen 2 from being affected by the temperature difference between the interior of the refrigerator and the outside environment.

In general, for the display screen 2 on the refrigerator door, since there exists a temperature difference between the inner and outer sides of the refrigerator door, vapor or condensation (foggy) will be generated on the outer-layer protective screen 11, the display screen 2 or the inner-layer protective screen 12, and this not only degrades the display effect of the display screen 2 and the effect of observation quality for the interior of the refrigerator through the display screen 2, but also shortens the service life of the display screen 2 by corroding the display screen 2 (the component is corroded after it becomes wet).

Addition of the thermal insulation device can avoid the generation of vapor or moisture condensation on the display screen 2 and guarantee the service life of the display screen 2 accordingly.

The thermal insulation device comprises a plurality of liners 41 and an inner screen 42; there are four liners 41, with one side of each liner being closely affixed to the inner-layer protective screen 12 and the other side of each liner to the inner screen 42. As a result, a hollow layer is formed between the inner-layer protective screen 12 and the inner screen 42 and can play a role of thermal insulation by isolating heat transfer between these two sides.

The liners 41 are hollow ones, each of which is filled with a molecular sieve therein for drying the hollow layer and preventing the situation where moisture enters the hollow layer to cause its affixation to one side of the inner screen 42 adjacent to the inner-layer protective screen 12 or one side of the inner-layer protective screen 12 adjacent to the inner screen 42.

The liners 41 are sealed off from the inner screen 42 and the inner-layer protective screen 12 by a sealing glue 43, respectively, which can prevent hot air or moisture from entering the hollow layer and protect the service life of the display screen 2.

The inner protrusion 321 of the inner door frame 32 is bonded with one side of the inner screen 42 away from the inner-layer protective screen 12, thereby pressing and limiting the inner screen 42.

The outer-layer protective screen 11, the display screen 2, the inner-layer protective screen 12, the liners 41 and the inner screen 42 are sequentially placed in the outer door frame 31, and the inner door frame 32 are in clamped connection with the outer door frame 31 so that the outer door frame 31, the outer-layer protective screen 11, the display screen 2, the inner-layer protective screen 12, the liners 41 and the inner door frame 32 are integrally assembled together.

<Backlight Device>

The refrigerator door further comprises a backlight device. The backlight device is located behind the display screen 2 and creates a backlight effect over the background of the display screen 2 to improve the display effect of the display screen 2.

In general, when products are refrigerated or preserved inside the refrigerator, their outer packages have diversified colors and it is thus relatively easy to observe the refrigerator through the refrigerator door. But in the meantime, these outer packages will act as background colors for the display screen 2 to affect the display effect of the display screen 2.

With the help of the backlight device, backlight can be produced over the background of the display screen 2, so as to improve the display effect of the display screen 2.

Wherein the backlight device comprises a plurality of LED lamps (not shown in the drawings), which are uniformly mounted at one side of the display screen 2 adjacent to the inner door frame 32. Thus backlight can be produced to improve the display effect of the display screen 2.

The mounting locations of the LED lamps correspond to that of the outer screen printing portion 111 and the LED lamps are consequently shielded by the outer screen printing portion 111, so as to prevent the light, which directly exits from the LED lamps, from being directly observed. Once the light directly exiting from the LED lamps is directly observed, observation for the display screen 2 will be affected owing to light intensity contrast, and on the other hand, the backlight effect will disappear to gravely affect the display effect of the display screen 2.

The LED lamps are cold-light lamps and thus the temperature difference between the interior of the display screen 2 and the outside can be avoided.

<Heating Device>

The refrigerator door further comprises a heating device that heats the inner-layer protective screen 12 to prevent the temperature difference between the interior of the refrigerator and the outside from affecting the display screen 2. In general, for the display screen 2 on the refrigerator door, since there exists a temperature difference between the inner and outer sides of the refrigerator door, vapor or moisture condensation will be generated on the outer-layer protective screen 11, the display screen 2 or the inner-layer protective screen 12, and this not only degrades the display effect of the display screen 2 and the effect of observation for the interior of the refrigerator through the display screen 2, but also shortens the service life of the display screen 2 by corroding the display screen 2 (the component is corroded after it becomes wet).

Addition of the heating device can avoid the generation of vapor or moisture condensation on the display screen 2 and guarantee the service life of the display screen 2 accordingly.

The heating device is a galvanized wire mounted at the edge of the inner-layer protective screen 12 to heat the inner-layer protective screen 12 to eliminate (or reduce) the temperature difference between the inner-layer protective screen 12 and the outer-layer protective screen 11 and avoid the generation of vapor or moisture condensation. The galvanized wire is mounted in the hollow portion 312 of the outer door frame 31. By doing so, on the one hand, the galvanized wire is protected from being damaged by external forces or from causing damage to the user after exposed, and on the other hand, the galvanized wire can be shielded to raise the aesthetic effect of the refrigerator door.

<Method for Removing Screen Coating Film>

The surface of an ordinary screen and the like, such as that of a display screen, will be coated with a film, such as a screen coating film, to improve light transmittance, protect the screen or achieve other purposes. And sometimes, due to this film coating or screen coating film, some performances of the film-coated screen fail to meet the requirements on particular occasions. In this case, this screen coating film on the screen needs to be removed.

Figure 3:
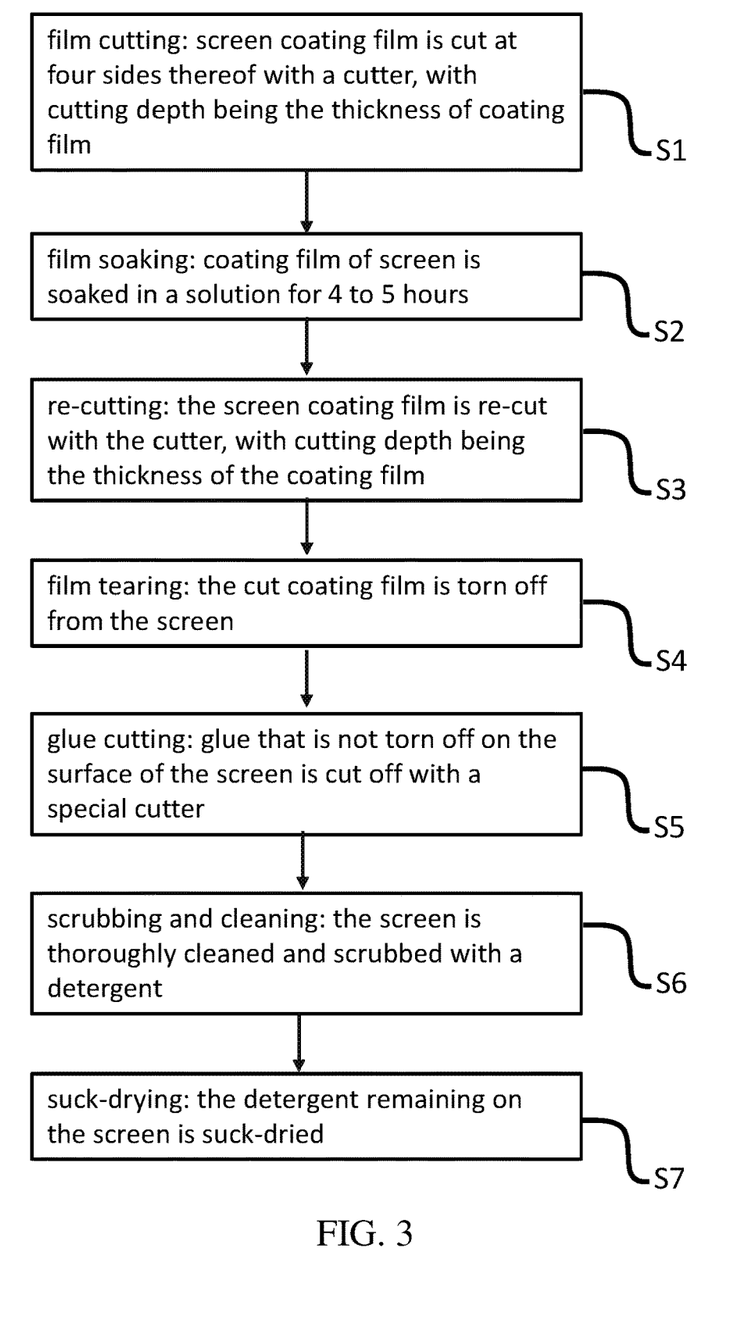
FIG. 3 is a flowchart showing removal of a screen coating film according to an embodiment in the present invention.

Shown in FIG. 3 is a flowchart of a method for removing a screen coating film according to an embodiment in the present application, and the method for removing the screen coating film comprises the following steps:

Step s1. Film cutting: the screen coating film is cut at four sides thereof with a cutter, with the cutting depth being the thickness of the coating film; In this step, the cutting depth is that the coating film is cut to the screen, but no damage is caused to the surface of the screen (that is to say, the cutting depth is equal to the thickness of the coating film). The reason for conducting this step is that a regular film-coated screen has its coating film bonded relatively closely with the surface of the screen, so both the sealing property and water resistance are excellent, and during subsequent soaking, it is quite difficult for a solution to enter a portion where the coating film and the screen are bonded; after the cutting in this step, the coating film of the screen can be cut apart to function as an inlet or flow channel for the solution while soaking, so that through the cut portion, the solution can enter the portion where the coating film and the screen are bonded during subsequent soaking. By doing so, on the one hand, the effect of soaking can be improved, and on the other hand, the time for soaking can be reduced as well.

Step s2. Film soaking: the coating film of the screen is soaked in a solution for 4 to 5 hours; The reason for conducting this step is that the solution needs to enter the portion where the coating film and the screen are bonded, to partially decompose or lubricate the glue on this bonding portion, in order to reduce the tightness of bonding between the screen and the coating film and facilitate the following separation of the coating film from the screen. Wherein the portion where the coating film and the screen are bonded is soaked in the solution, and this is meant to enable the solution to enter the portion where the coating film and the screen are bonded. Normally, the entire screen should be placed in the solution. But during actual practice, water resistance of some screens is not good enough, and if these screens are completely soaked, it is highly possible that the solution infiltrates into the screens to degrade their performances (or the screens cannot be completely soaked for other reasons). As a consequence, the screens are partially soaked in the solution, and yet such a condition that the portion where the screen and the coating film are bonded is soaked in the solution needs to be met.

Step s3. Re-cutting: the screen coating film is re-cut with the cutter, with the cutting depth being the thickness of the coating film; In this step, the cutting depth is that the coating film is cut to the screen, but no damage is caused to the surface of the screen (that is to say, the cutting depth is equal to the thickness of the coating film). The reason for conducting this step is that in the event that the coating film is to be directly torn off under normal conditions, it cannot be torn off from the screen or torn off as a whole because due to the excessively wide area of the coating film, an overly large force is required to tear off the coating film from the screen. In this step, cutting the screen coating film into strips with the cutter contributes to tearing the coating film off from the screen.

Step s4. Film tearing: the cut coating film is torn off from the screen;

Step s5. Glue cutting: glue that is not torn off on the surface of the screen is cut off with a special cutter; The reason for conducting this step is that following the tearing of the coating film, a part of glue that bonds the coating film with the screen will remain on the surface of the screen and affect the appearance and image display of the screen. Therefore, it is required that the remaining glue is cut off with the special cutter. The special cutter has a flat cutting edge, and this is because the remaining glue has a very small thickness and is affixed to the surface of the screen. If a cutter having a non-flat cutting edge is put in use, it needs to be inclined while cutting the glue, which accordingly increases the difficulty in glue cutting. In addition, the force needs to be applied in a direction horizontal to the screen during glue cutting. Using the inclined cutter to apply the force horizontally, on the one hand, requires larger applying strength, so unnecessary consumption is aroused. And on the other hand, it is not easy to control the direction of force application. Once there is a change in the direction of force application, the cutting edge will go towards the screen and leave scratches on the screen, making the screen nonfunctional or degrading its performances.

Step s6. Scrubbing and cleaning: the screen is thoroughly cleaned and scrubbed with a detergent; The reason for conducting this step is that after the glue is cut off, the screen will be stained with small particles that affect its definition, such as dirt, glue debris, etc., and these particles need to be removed. The detergent in this step is not a proper noun, but a collective term of liquids capable of cleaning away dirt, glue debris and other small particles on the screen.

Step s7. suck-drying: the detergent remaining on the screen is suck-dried or suction removed. Thus the coating film can be smoothly removed from the screen after the steps s1 to s7, and the method is simpler in process and convenient for operation.

<Variations of Embodiment>

In the above-mentioned embodiment, the display screen 2 may be a TFT liquid crystal screen, and may also be a CRT display screen, an LCD liquid crystal screen, an LED screen and the like. Each of these screens can be used as the display screen in the present application, as long as it can display information.

In the above-mentioned embodiment, the display screen 2 may be a single display screen, and may also be formed by splicing a plurality of display screens. The plurality of display screens are situated on the spliced display screen 2, and different content is displayed by each splicing portion.

In the above-mentioned embodiment, the TFT liquid crystal screen may be a single TFT liquid crystal screen, and may also be formed by splicing a plurality of TFT liquid crystal screens. The plurality of liquid crystal screens are situated on the spliced TFT liquid crystal screen, and different content is displayed by each splicing portion.

In the above-mentioned embodiment, the transparent refrigerator door described above may also be used on occasions where transparent screens are required, such as museum showcases, cold storage doors or office doors. On these occasions, the used device including the transparent screen only needs to comprise a display device, a gripping device and a control device.

In the above-mentioned embodiment, the size of the outer blank portion 112 may be the same as or different from the display size of the display screen 2. Yet, the size of the outer blank portion 112 should be no less than the display size of the display screen 2, otherwise the outer screen printing portion 111 will shield the display content of the display screen 2 to adversely affect the display effect. Wherein the display size of the display screen 2 may be the size of the entire display screen 2 (displaying in a full screen mode without black borders at the edge), and may also be a part of the size of the display screen 2 (i.e. only a part in the middle or at one side of the display screen 2 can be provided for display purposes).

In the above-mentioned embodiment, the outer screen printing portion 111 and the inner screen printing portion 121 may be formed by screen printing at the edges of the outer-layer protective screen 11 and the inner-layer protective screen 12, and may also be of other configurations that can provide shielding, e.g. affixed frosted films, affixed stickers and the like, as long as they can shield (opaque) the device behind. In the above-mentioned embodiment, the outer-layer protective screen 11 may be tempered glass, and may also be articles made of transparent materials like transparent plastic, transparent crystal or ultra-clear glass, as long as it is so transparent that the display of the display screen 2 is not affected. Wherein the tempered glass, which has high strength and is less likely to be damaged, can provide better protection for the display screen 2, and the tempered glass will be turned into particles even if it is broken, so that the display screen 2 or the user will not be scratched.

In the above-mentioned embodiment, the outer-layer protective screen 11 is ultra-clear glass. This ultra-clear glass, also known as low-iron glass or highly transparent glass, is ultra-transparent low-iron glass, which is crystal-clear and has extremely high light transmittance, so that the display screen 2 can provide a clearer display and the content displayed by the display screen 2 or the real condition of the articles refrigerated or preserved inside the refrigerator can be better highlighted.

In the above-mentioned embodiment, the outer-layer protective screen 11 is ultra-clear glass having a thickness of 3-6 mm, which has a visible light transmittance of 91%, so that the display screen 2 can provide a clearer display and the content displayed by the display screen 2 or the real condition of the articles refrigerated or preserved inside the refrigerator can be better highlighted. And meanwhile, the ultra-clear glass having a thickness of 3-6 mm has high hardness and is less likely to be damaged.

In the above-mentioned embodiment, the outer-layer protective screen 11 is preferably ultra-clear glass having a thickness of 4 mm, which has a light transmittance of over 91.5%, good display effect and the best hardness and also is less likely to be damaged.

In the above-mentioned embodiment, the inner-layer protective screen 12 may be tempered glass, and may also be articles made of transparent materials like transparent plastic, transparent crystal or ultra-clear glass, as long as it is so transparent that exhibition of the articles refrigerated or preserved inside the refrigerator is not affected. Wherein the tempered glass, which has high strength and is less likely to be damaged, can provide better protection for the display screen 2, and the tempered glass will be turned into particles even if it is broken, so that the display screen 2 or the user will not be scratched.

In the above-mentioned embodiment, the inner-layer protective screen 12 is ultra-clear glass. This ultra-clear glass, also known as low-iron glass or highly transparent glass, is ultra-transparent low-iron glass, which is crystal-clear and has extremely high light transmittance, so that the articles can be displayed in a clearer way and the real condition of the articles refrigerated or preserved inside the refrigerator can be better highlighted.

In the above-mentioned embodiment, the inner-layer protective screen 12 is ultra-clear glass having a thickness of 3-6 mm, which has a visible light transmittance of 91%, so that the articles can be displayed in a clearer way and the real condition of the articles refrigerated or preserved inside the refrigerator can be better highlighted. And meanwhile, the ultra-clear glass having a thickness of 3-6 mm has high hardness and is less likely to be damaged.

In the above-mentioned embodiment, the inner-layer protective screen 12 is preferably ultra-clear glass having a thickness of 4 mm, which has a light transmittance of over 91.5%, good display effect and the best hardness and also is less likely to be damaged.

In the above-mentioned embodiment, the inner screen 42 may be tempered glass, and may also be articles made of transparent materials like transparent plastic, transparent crystal or ultra-clear glass, as long as it is so transparent that exhibition of the articles refrigerated or preserved inside the refrigerator is not affected. Wherein the tempered glass has high strength and is less likely to be damaged, and will be turned into particles even if it is broken, so that the user will not be scratched.

In the above-mentioned embodiment, the inner screen 42 is ultra-clear glass. This ultra-clear glass, also known as low-iron glass or highly transparent glass, is ultra-transparent low-iron glass, which is crystal-clear and has extremely high light transmittance, so that the articles can be displayed in a clearer way and the real condition of the articles refrigerated or preserved inside the refrigerator can be better highlighted.

In the above-mentioned embodiment, the inner screen 42 is ultra-clear glass having a thickness of 3-6 mm, which has a visible light transmittance of 91%, so that the articles can be displayed in a clearer way and the real condition of the articles refrigerated or preserved inside the refrigerator can be better highlighted. And meanwhile, the ultra-clear glass having a thickness of 3-6 mm has high hardness and is less likely to be damaged.

In the above-mentioned embodiment, the inner screen 42 is preferably ultra-clear glass having a thickness of 4 mm, which has a light transmittance of over 91.5%, good display effect and the best hardness and also is less likely to be damaged. In the above-mentioned embodiment, the cushion glue preferably has a thickness of 0.5 mm, in which case the best cushioning effect is offered and the situation where watermarks are created is avoided.

In the above-mentioned embodiment, there may be no cushion glue between the display screen 2 and the outer-layer protective screen 11.

In the above-mentioned embodiment, there may be no cushion glue between the display screen 2 and the inner-layer protective screen 12.

In the above-mentioned embodiment, the refrigerator door comprises a display device, a gripping device, a fixing device and a control device, and may also be provided with at least one of a thermal insulation device, a backlight device and a heating device, or not provided with any of the thermal insulation device, the backlight device and the heating device.

In the above-mentioned embodiment, the information receiving end is one or more of the group consisting of a video interface, a USB interface, a memory interface, a WiFi interface, a wireless interface and a network cable interface, wherein the video interface may be one or more of the group consisting of an HDMI interface, a DVI interface and a VGA interface. Thus, the controller can receive information in various forms and adapt to disparate conditions of usage.

In the above-mentioned embodiment, both the inner-layer protective screen 12 and the inner screen 42 may be transparent or opaque, and it is also possible that one of the both is transparent, while the other is opaque. The inner-layer protective screen 12 and the inner screen 42, if opaque, can be used as the background of the display screen 2, thereby enhancing the display effect of the display screen 2.

In the above-mentioned embodiment, the background color (the color visible from the display screen 2) of the display screen 2 is white, and thus with the aid of pure white background refraction, the display screen 2 provides the best display effect.

In the above-mentioned embodiment, the background color (the color visible from the TFT liquid crystal screen) of the TFT liquid crystal screen is white, and thus with the aid of pure white background refraction, the TFT liquid crystal screen provides the best display effect.

In the above-mentioned embodiment, the LED lamps may be mounted between the display screen 2 and the inner-layer protective screen 12, or in the hollow layer of the inner-layer protective screen 12 and the inner screen 42, or at one side of the inner screen 42 away from the inner-layer protective screen 12, or in the hollow portion 312 of the outer door frame 31, as long as they are shielded by the outer screen printing portion 111 or the outer door frame 31 and can impart a backlight effect to the display screen 2.

In the above-mentioned embodiment, the plurality of LED lamps of the backlight device may make up a module to work as an integral backlight source, and may also be individual (i.e. the LED lamps are independent of one another) to work as a backlight. The fact that the module (e.g. an LED light bar) is made up from the plurality of LED lamps facilitates mounting and brings good display effect. The backlight device may also be a long lamp tube, and in this way it is easy for arrangement and convenient to mount.

In the above-mentioned embodiment, the heating device may be a galvanized wire, and may also be a heating film that is affixed to and heats the inner-layer protective screen 12.

In the above-mentioned embodiment, the display screen 2 may serve as an integral refrigerator door or as a part in the middle of the refrigerator door. When serving as a part of the refrigerator door, one side of the port 21 of the display screen 2 overlaps with one side of the refrigerator door, which accordingly helps hide the port 21 as well as a conducting wire that probably exists for signal transmission or power supply for the TFT screen.

In the above-mentioned embodiment, on the basis of the steps s1 to s7, a step s8. film affixing may also be added: another coating film is affixed to the screen. Thus, after the steps s1 to s8, the coating film on the screen can be replaced conveniently and rapidly; the old coating film may be replaced with a new one, or one coating film may be replaced with another. As a result, the scope of application of the screen can be expanded.

In the above-mentioned embodiment, the detergent in the steps s6 and s7 may be washing-up liquid, or alcohol. The alcohol may be pure alcohol, or a water-miscible aqueous solution in which the miscible ratio may be any ratio.

In the above-mentioned embodiment, the detergent in the steps s6 and s7 is preferably alcohol. The alcohol has a high volatilization rate and is easy to be removed, so that the speed of removing the residual detergent is raised and the cleaning effect is better.

In the above-mentioned embodiment, sometimes (disassembly and recovery of waste articles) only the coating film needs to be removed from the screen, without secondary cleaning for the screen. Then only the steps s1 to s4 can be conducted, so that the coating film can be fast removed from the screen to achieve high efficiency. In the above-mentioned embodiment, the solution may be clean water, or an aqueous solution containing washing-up liquid, or an aqueous solution containing other substances that can affect glue viscosity.

In the above-mentioned embodiment, the solution is preferably the aqueous solution containing washing-up liquid, and this not only can separate the coating film from the screen effectively, but also results in low costs and great convenience in purchasing the solution.

In the above-mentioned embodiment, the screen may be a TFT screen, or an LCD/LED screen. In the above-mentioned embodiment, the screen may be a TFT screen, so that the film affixed to the TFT screen can be removed.

In the above-mentioned embodiment, the method may also be applied to a polarizing film of the TFT screen to remove the polarizing film.

In the above-mentioned embodiment, the method may also be applied to a polarizing film of the TFT screen to replace the polarizing film with a light transmissive film or a highly transparent film, with an aim of improving the light transmittance of the TFT screen.

In the above-mentioned embodiment, the method may also be applied to films at the both sides of the TFT screen. With the films being affixed to the both sides of the TFT screen, these films at the both sides of the TFT screen may be replaced or removed simultaneously or sequentially replaced or removed, and it is also possible that only the film at one side of the TFT screen is replaced or removed. In the above-mentioned embodiment, the cutter is a utility knife or a scalpel.

In the above-mentioned embodiment, in the step s1, the screen coating film may not be cut at four sides thereof, but at other locations thereof, e.g. a middle location, or quarter locations, or the rest locations where the coating film is bonded with the screen. While soaking in the solution, the speed of infiltration into the portion where the coating film is bonded with the screen should be similar to the speeds of infiltration into various portions. Thus, when the coating film is cut at the middle location thereof, the speed of the solution infiltrating into the portion where the entire coating film is bonded with the screen should be equal to that when the coating film is cut at four sides thereof; when the screen coating film is cut at the quarter locations thereof, the solution is only required to infiltrate into locations a quarter distance from the opening, and through these four cutting locations, the solution can completely infiltrate into the portion where the entire screen coating film is bonded with the screen, resulting in a shorter soaking time.

In the above-mentioned embodiment, the screen coating film is cut, soaked and re-cut in the steps s1 to s3. The coating film can be cut and soaked just once, and thus during this film cutting, the screen coating film is cut at both the four sides and the middle thereof; alternatively, the coating film may be cut many times and soaked once, and thus the coating film is cut before and after the film soaking; alternatively, the coating film may be cut once and soaked many times, and thus the coating film is soaked before and after the film cutting; alternatively, the coating film may be cut many times and also soaked many times, and thus the coating film is sequentially cut and soaked in a cyclic fashion until the coating film is separated from the screen. In the above-mentioned embodiment, the screen coating film is cut, soaked and re-cut in the steps s1 to s3, and the reason for doing this is that the coating film is closely bonded with the screen and thus is difficult to cut before being soaked, and cutting the coating film in such a case tends highly to scratches on the surface of the screen to further reduce the performances and acceptance rate of the screen. Meanwhile, the coating film needs to be cut before being soaked, otherwise the time for film soaking is long and the effect of film soaking is unsatisfactory. Therefore, when the coating film is cut at four sides thereof, the occurrence of scratches at the locations of the screen corresponding to the four sides of the coating film has a relatively small impact on the display effect of the screen, and on the other hand, in the case that the screen needs to be re-cut, adverse influences resulting from the scratches can be eradicated by cutting off the side having the scratches thereon, and simultaneously, cutting the coating film at the four sides thereof can lead to a high film soaking speed during film soaking, and it is simply demanded that the solution entering each cut infiltrates into a half width of the screen. Following the film soaking, the bonding between the coating film and the screen becomes loose and it is hence easy to cut the coating film at this moment, and also it is quite easy for the cutting edge of the cutter to avoid its touch on the surface of the screen, so that the interior of the coating film can be cut at this moment to facilitate tearing-off of the coating film. Thus, the first cutting at the four sides of the coating film can improve the film soaking speed and save the time for film soaking, the second cutting makes it possible that the coating film is rapidly torn off from the screen, and cutting the coating film at the four sides thereof enables an improvement in the acceptance rate of the product.

In the above-mentioned embodiment, the cutter, and the special cutter in the step s5 may be of the same type.

In the above-mentioned embodiment, the time for film soaking may be 4 hours, 4.5 hours or 5 hours in the step s2. Preferred is 4.5 hours over which the portion where the coating film is bonded with the screen is fully soaked, and the time for soaking is shortened.

The above description is merely the preferred embodiments of the present invention and is only illustrative of the present invention, rather than limitations thereto. It will be appreciated by those skilled in the art that many variations, modifications and even equivalents could be made within the spirit and scope as defined in the claims of the present invention, and all fall within the scope of protection of the present invention.

What is claimed is:

1. A method for removing a screen coating film, characterized by comprising steps of:
   step s1: film cutting: cutting a screen coating film of a screen at four sides thereof with a cutter, with a cutting depth being the thickness of the screen coating film;
   step s2: film soaking step: soaking the screen coating film of the screen in a solution for 4 to 5 hours;
   step s3: additional cutting step: additionally cutting the screen coating film with the cutter, with the cutting depth being the thickness of the screen coating film;
   step s4: film tearing step: tearing the cut screen coating film off from the screen;
   step s5: glue cutting step: cutting off glue that is not torn off on the surface of the screen with a special cutter;
   step s6: scrubbing and cleaning step: thoroughly cleaning and scrubbing the screen with a detergent; and
   step s7: suck-drying step: suck-drying the detergent remaining on the screen.

2. The method for removing the screen coating film of claim 1, wherein the special cutter has a flat cutting edge.

3. The method for removing the screen coating film of claim 1, wherein the detergent is alcohol.

4. The method for removing the screen coating film of claim 1, wherein the solution is an aqueous solution containing washing-up liquid.

5. The method for removing the screen coating film of claim 1, wherein the screen is a TFT liquid crystal screen, an LCD screen or an LED screen.

6. The method for removing the screen coating film of claim 1, wherein the coating film is a polarizing film.

7. The method for removing the screen coating film of claim 1, wherein the cutter is a utility knife or a scalpel.

8. The method for removing the screen coating film of claim 1, wherein time for soaking of the screen coating film in the solution is 4.5 hours.

9. The method for removing the screen coating film of claim 1, wherein further comprising a step s8 film affixing step: affixing another coating film to the screen.

* * * * *